United States Patent
Royon et al.

(10) Patent No.: US 9,629,037 B2
(45) Date of Patent: Apr. 18, 2017

(54) HANDOVER OF A MOBILE DEVICE IN AN INFORMATION CENTRIC NETWORK

(71) Applicant: Telefonaktiebolaget L M Ericsson (publ), Stockholm (SE)

(72) Inventors: Yvan Royon, San Jose, CA (US); Hari Rangarajan, San Jose, CA (US); Peyman Talebi Fard, Montréal (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 118 days.

(21) Appl. No.: 14/738,517

(22) Filed: Jun. 12, 2015

(65) Prior Publication Data

US 2016/0366620 A1 Dec. 15, 2016

(51) Int. Cl.
*H04W 36/00* (2009.01)
*H04L 29/08* (2006.01)
*H04L 29/12* (2006.01)

(52) U.S. Cl.
CPC ......... *H04W 36/0055* (2013.01); *H04L 67/10* (2013.01); *H04L 61/302* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 9,456,052 B2 * | 9/2016 | Lee | H04L 67/32 |
| 9,461,907 B2 * | 10/2016 | Yu | H04L 45/08 |
| 2013/0016695 A1 | 1/2013 | Ravindran et al. | |
| 2013/0039249 A1 | 2/2013 | Ravindran et al. | |
| 2013/0329696 A1 | 12/2013 | Xu et al. | |

OTHER PUBLICATIONS

J. Postel, "User Datagram Protocol," Aug. 28, 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
C. Hedrick, "Routing Information Protocol," Jun. 1988, 33 pages, Network Working Group, Request for Comments: 1058.

(Continued)

*Primary Examiner* — Hong Cho
(74) *Attorney, Agent, or Firm* — Nicholson De Vos Webster & Elliott LLP

(57) ABSTRACT

A method in a first content centric networking (CCN) access point of a CCN network of enabling seamless mobility of a mobile device is disclosed. The method includes detecting a handover initiation event that is an indication that a handover of the mobile device from the first CCN access point to a second CCN access point from a group of one or more CCN access points of the CCN network is initiated. In response to detecting the handover initiation event, the method continues with starting transmission, to the group of CCN access points, of one or more pending interests associated with the mobile device. The method further includes detecting a handover completion event, and stopping, in response to detecting the handover completion event, the transmission of the one or more pending interests associated with the mobile device.

25 Claims, 10 Drawing Sheets

(56) References Cited

OTHER PUBLICATIONS

David Oran, "OSI IS-IS Intra-domain Routing Protocol," Feb. 1990, 157 pages, Network Working Group, Request for Comments: 1142.
T. Socolofsky, et al., "A TCP/IP Tutorial," Jan. 1991, 28 pages, Network Working Group, Request for Comments: 1180.
G. Malkin, et al., "RIPng for IPv6," Jan. 1997, 19 pages, Network Working Group, Request for Comments: 2080.
R. Braden, et al., "Resource ReSerVation Protocol (RSVP)—Version 1 Functional Specification," Sep. 1997, 112 pages, Network Working Group, Request for Comments: 2205.
J. Wroclawski, "The Use of RSVP with IETF Integrated Services," Sep. 1997, 33 pages, Network Working Group, Request for Comments: 2210.
J. Wroclawski, "Specification of the Controlled-Load Network Element Service," Sep. 1997, 19 pages, Network Working Group, Request for Comments: 2211.
S. Shenker, et al., "Specification of Guaranteed Quality of Service," Sep. 1997, 20 pages, Network Working Group, Request for Comments: 2212.
J. Moy, "OSPF Version 2," Apr. 1998, 244 pages, Network Working Group, Request for Comments: 2328, The Internet Society.
G. Malkin, "RIP Version 2," Nov. 1998, 39 pages, Network Working Group, Request for Comments: 2453, The Internet Society.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
D. Awduche, et al., "RSVP-TE: Extensions to RSVP for LSP Tunnels," Dec. 2001, 61 Pages, Network Working Group, Request for Comments: 3209, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.

K. Chan, et al., "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.
Y. Rekhter, et al., "A Border Gateway Protocol 4 (BGP-4)," Jan. 2006, 104 pages, Network Working Group, Request for Comments: 4271, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IS Virtual Private Networks (VPNs)," Feb. 2006, 47 pages, Network Working Group, Request for Comments: 4364, The Internet Society.
J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.
Z. Ali, et al., "Node-ID Based Resource Reservation Protocol (RSVP) Hello: A Clarification Statement," Jun. 2006, 7 pages, Network Working Group, Request for Comments: 4558, The Internet Society.
J. Babiarz, et al., "Configuration Guidelines for DiffServ Service Classes," Aug. 2006, 57 pages, Network Working Group, Request for Comments: 4594, The Internet Society.
K. Kompella, et al., "Virtual Private LAN Service (VPLS) Using BGP for Auto-Discovery and Signaling," Jan. 2007, 28 pages, Network Working Group, Request for Comments: 4761, The IETF Trust.
M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.
L. Andersson, et al., "LDP Specification," Oct. 2007, 135 pages, Network Working Group, Request for Comments: 5036, The IETF Trust.
R. Coltun, et al., "OSPF for IPv6," Jul. 2008, 94 pages, Network Working Group, Request for Comments: 5340, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.
M. Mosko, "CCNx Semantics; draft-mosko-icnrg-ccnxsemantics-00," ICNRG, Internet-Draft, Jan. 9, 2015, pp. 1-23.
C. Perkins et al., "Mobile IPv4 Challenge/Response Extensions (Revised)," Network Working Group, Request for Comments: 4721, Jan. 2007, pp. 1-26.
"CCNx Specifications," <http://www.ccnx.org/specifications/>, retrieved Jun. 12, 2015, 3 pages.
Mosko et al., "CCNx Semantics draft-mosko-icnrg-ccnxsemantics-01," ICNRG, Internet-Draft, Mar. 9, 2015, pp. 1-24.
Mosko et al., "CCNx Messages in TLV Format draft-mosko-icnrg-ccnxmessages-01," ICNRG, Internet Draft, Mar. 9, 2015, pp. 1-32.
Mosko, "Labeled Content Information draft-mosko-icnrg-ccnxlabeledcontent-00," ICNRG, Internet Draft, Jan. 9, 2015, pp. 1-16.

(56) References Cited

OTHER PUBLICATIONS

Mosko, "CCNx Content Object Chunking draft-mosko-icnrg-ccnxchunking-00," ICNRG, Internet Draft, Jan. 9, 2015, pp. 1-13.
Mosko, "CCNx End-To-End Fragmentation draft-mosko-icnrg-ccnxfragmentation-00," ICNRG, Internet Draft, Jan. 9, 2015, pp. 1-14.
Mosko, "CCNx Publisher Serial Versioning draft-mosko-icnrg-ccnxserialversion-00," ICNRG, Internet Draft, Jan. 9, 2015, pp. 1-9.
Mosko, "CCNx Label Forwarding (CCNLF) ccnx-mosko-labelforwarding-01," Internet Engineering Task Force, Internet-Draft, Jul. 21, 2014, 8 pages.
Mosko, "CCNx Publisher Clock Time Versioning draft-mosko-icnrg-timeversion-00," Internet Engineering Task Force, Internet-Drafts, Jan. 2015, pp. 1-5.

* cited by examiner

300

Detect a handover initiation event, where the handover initiation event is an indication that a handover of a mobile device from a first CCN access point to a second CCN access point from a group of one or more access points is initiated
302

Select the pending interests associated with the mobile device based on an identification associated with the mobile device
304

Responsive to detecting the handover initiation event, start transmission, to the group f one or more access points, of one or more pending interests associated with the mobile device
306

Detect a handover completion event
308

Stop, in response to detecting the handover completion event the transmission of the one or more pending interests associated with the mobile device
310

Remove PIT entries corresponding to the pending interests from the pending interest table of the first CCN access point
312

FIG. 3

HANDOVER OF A MOBILE DEVICE IN AN INFORMATION CENTRIC NETWORK

FIELD

Embodiments of the invention relate to information centric networks (ICN). Specifically, the embodiments relate to a method of efficiently handling handovers of a mobile device in Information Centric Networks (ICNs).

BACKGROUND

An ICN is a conceptualization of the networking protocol stack, in particular layers 3 and above of a network protocol stack. A CCN is a particular architecture and implementation of an ICN. ICNs and CCNs are based on the premise of naming resources in these networks. In particular the naming relates to the use of a globally shared namespace for objects that allows entities in these networks to retrieve any content of interest.

Thus, with a CCN a name is utilized to identify a content object instead of an Internet Protocol (IP) address of the content or a host of the content. In an IP network, routing is based on host names (e.g., source and destination addresses). In a CCN by contrast, routing is based on a uniform resource identifier (URI) or similar identifier for a content object. CCN routing is performed hop-by-hop, using a longest prefix matching on the CCN name. All communications seeking to access data are framed as a request and response transaction. A CCN client sends a message referred to as a CCN interest to the nodes in the CCN. The nodes of the CCN respond with a content object identified by a CCN name in the CCN interest. These CCN content objects are returned via a CCN response. Content object packets follow the reverse path of the corresponding Interest. The reverse path is computed based on state left by Interest packets at each node, in a database called the PIT (Pending Interest Table).

All content object packets are cryptographically signed by their initial provider. A CCN client can thus verify the integrity and authenticity of the content even if the packet comes from untrusted links or untrusted hosts. As a direct effect, CCN nodes in the CCN network are allowed to cache packets locally in a table called the content store. When a CCN network node receives a CCN interest packet, it can check whether its local content store has the requested content object and can send it back if found. The look up in the content store is by the CCN name. If the CCN name is not found in the local content store, then the CCN interest is forwarded according to entries for the CCN name in a forwarding information base (FIB) of the CCN network node.

Mobility in a communication network requires handover support which refers to the process of transferring an ongoing call or data session from one data path connected to the core network to another data path. When a mobile device is moving away (e.g., as a result of their geographical movement) from the area covered by the access point which connects the mobile device to the communication network, and enters an area covered by another access point providing access to the same communication network or to another communication network, a handover or a roaming procedure is performed. In other cases, the handover may be performed if the current access point covering the mobile device reaches a maximum capacity, a new or existing call or data transfer can be transferred to another access point for connecting the mobile device to the network.

SUMMARY

A method in a first content centric networking (CCN) access point of a CCN network of enabling seamless mobility of a mobile device in the CCN network is disclose. The method includes detecting a handover initiation event, where the handover initiation event is an indication that a handover of the mobile device from the first CCN access point to a second CCN access point from a group of one or more CCN access points of the CCN network is initiated. The method continues with, in response to detecting the handover initiation event, starting transmission, to the group of CCN access points, of one or more pending interests associated with the mobile device, where the one or more pending interests are stored as one or more entries of a pending interest table (PIT) in the first CCN access point. The method further includes detecting a handover completion event, and stopping, in response to detecting the handover completion event, the transmission of the one or more pending interests associated with the mobile device.

A method, in a first network device, of enabling seamless mobility of a mobile device in a content centric networking (CCN) network is disclosed. The method includes detecting a handover initiation event, where the handover initiation event is an indication that a handover of the mobile device from a first CCN access point to a second CCN access point of the CCN network is initiated. The method continues with receiving, from a second network device and following the detecting of the handover initiation event, one or more pending interests associated with the mobile device. The method further includes adding the one or more pending interests associated with the mobile device as one or more entries in a pending interest table (PIT), where each of the one or more entries includes an identification associated with the mobile device.

A method, in a first network device of a content centric networking (CCN) network coupled with a first CCN access point, of enabling seamless mobility of a mobile device from the first CCN access point to a second CCN access point is disclosed. The method includes receiving a handover initiation notification, where the handover initiation notification is an indication that a handover of the mobile device from the first CCN access point to the second CCN access point is initiated. The method further includes identifying a second network device in the CCN network coupled with the second CCN access point. The method continues with updating, in response to detecting the handover initiation notification and to identifying the second network device, pending interest table (PIT) entries associated with the mobile device to include an identification of the second network device.

A content centric networking (CCN) access point of a CCN network is disclosed. The CCN access point includes a non-transitory computer-readable medium having a computer program code stored, and a processor coupled to the non-transitory computer-readable medium, the processor operative to execute the computer program code to perform operations including detecting a handover initiation event, where the handover initiation event is an indication that a handover of a mobile device from the CCN access point to another CCN access point from a group of one or more CCN access points of the CCN network is initiated. The operations also include responsive to detecting the handover initiation event, starting transmission, to the group of CCN access points, of one or more pending interests associated with the mobile device, where the one or more pending interests are stored as one or more entries of a pending interest table (PIT) in the CCN access point. The operations further include detecting a handover completion event. The operations also include stopping, in response to detecting the handover completion event, the transmission of the one or more pending interests associated with the mobile device.

A network device in a content centric networking (CCN) network is disclosed, the network device being operative to enable a seamless handover of a mobile device in the CCN network. The network device includes a non-transitory computer-readable medium having a computer program code stored, and a processor coupled to the non-transitory computer-readable medium, the processor operative to execute the computer program code and perform operations including detecting a handover initiation event, where the handover initiation event is an indication that a handover of a mobile device from a first CCN access point to a second CCN access point of the CCN network is initiated. The operations further include receiving, from another network device and following the detecting of the handover initiation event, one or more pending interests associated with the mobile device. The operations also include adding the one or more pending interests associated with the mobile device as one or more entries in a pending interest table (PIT), where each of the one or more entries includes an identification associated with the mobile device.

A network device of a content centric networking (CCN) network coupled with a first CCN access point is disclosed. The network device being operative to enable a seamless handover of a mobile device in the CCN network. The network device includes a non-transitory computer-readable medium having a computer program code stored and a processor coupled to the non-transitory computer-readable medium, the processor operative to execute the computer program code to perform operations including receiving a handover initiation notification, where the handover initiation notification is an indication that a handover of a mobile device from the first CCN access point to a second CCN access point is initiated. The operations also includes identifying another network device in the CCN network coupled with the second CCN access point. The operations further includes updating in response to the detection of the handover initiation notification and to identifying the other network device, pending interest table (PIT) entries associated with the mobile device to include an identification of the other network device.

The present methods and systems of the invention provide an efficient, simple and fast handover mechanism in a CCN. The embodiments of the invention enable seamless mobility of an end-user device without loss of data traffic during the handover. The embodiments of the invention enable a fast handover of the end-user device from a first access point to another access point by enabling a fast redirections of traffic to the new access point.

BRIEF DESCRIPTION OF THE DRAWINGS

The invention may best be understood by referring to the following description and accompanying drawings that are used to illustrate embodiments of the invention. In the drawings:

FIG. 3 is a flow diagram illustrating operations performed in a first Content Centric Networking (CCN) access point of a CCN network of enabling seamless mobility of a mobile device in the CCN network according to some embodiments of the invention.

DESCRIPTION OF EMBODIMENTS

Figure 1:
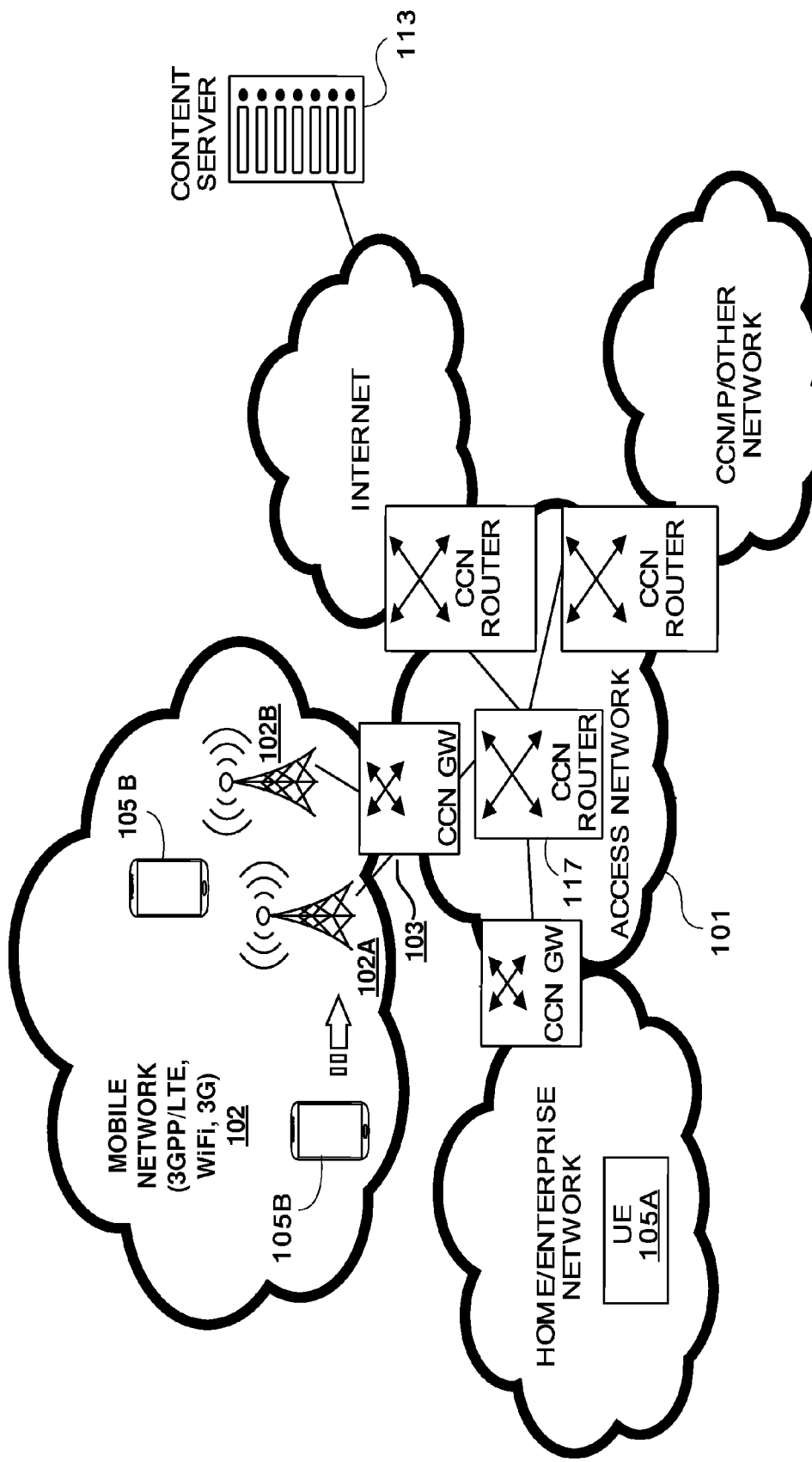
FIG. 1 illustrates a block diagram of one example of an architecture of a content centric networking (CCN) network according to some embodiments of the invention.

The following description describes methods and apparatus for enabling seamless mobility of a mobile device in the ICN network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Overview

Examples provided herein are with relation to a Content Centric Network (CCN), however, one skilled in the art would understand that the principles and structures described herein are also applicable to other ICNs that store CCN forwarding states (e.g., pending interests stored in a pending interest table (PIT)) on network devices (e.g., router, gateways, access points, etc.). The implementation of the processes, functions and architecture are described with regard to CCN by way of example rather than limitation and Pending Interest Tables are used as an example of states kept on the network devices.

All communications in a CCN are based on a request-response framework. A CCN client sends an Interest (e.g., requesting content associated with a name), and a node in the CCN responds with a Content Object (e.g., content objects associated with that name). In order to reach the CCN client (e.g., an end-user device connected to a mobile network) which requested the content, content objects follow the reverse path of the corresponding Interest in the CCN network. The reverse path is determined based on states left in the PIT by Interest packets at each node that the Interest packets traverse in the CCN network.

Challenges of Mobility in Communication Networks

In an IP network, communications happen between two endpoints (the source and the destination). In mobile IP, mobility is handled through pipes or tunnels between the endpoints. In an LTE network for example, for an end-user device to move, communication tunnels to that device must move as well.

Mobility in a CCN is addressed from an end-user device standpoint (which may be referred to as client mobility). In one approach, when an end-user device (such end user devices include workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances and may be referred to as mobile devices) moves in the CCN network, and disconnects from a first access point to become attached to a new access point, pending requests stored at the first access point will time out. In this approach, no reverse path is established to the new location (new access point), therefore content objects associated with the pending requests (which were generated when the end-user device was connected with the first access point) cannot find their way back to the mobile device. The mobile device will then simply re-issue the requests upon its connection to the new access point. As there are no endpoint addresses like in IP, the communication will resume, after a downtime (e.g., the downtime may be defined based on the expiration of a timer).

The approach presented above does not provide a good-end user experience. A CCN client device (e.g., a mobile device) needs to wait for its requests to time-out and to re-send the requests in case of a handover/roaming of the device. During this period, the CCN client device may not receive packets of data resulting in a loss of data and a poor service quality for the user of the CCN client.

Seamless Mobility in a CCN Network

There is a need for an improved CCN mobile user-experience. A mobile network infrastructure can provide a mechanism that enables seamless CCN mobility when the end-user device roams within the mobile network (such as 3G, LTE, Wi-Fi, etc.). Seamless handover is achieved when no data is lost during the execution of the handover, and when no retransmission or other error-correction mechanisms are needed on the mobile device, which will result in an improved mobile user-experience.

The embodiments of the invention overcome the limitations of the prior art. The present methods and systems of the invention provide an efficient, simple and fast handover mechanism in a CCN. The embodiments of the invention enable seamless mobility of an end-user device without loss of data traffic during the handover. The embodiments of the invention enable a fast handover of the end-user device from a first access point to another access point (redirections of traffic only lasts for the duration of a PIT entry (interest) which is in the order of sub-seconds to seconds, then the traffic is directly transmitted to the new location, and the convergence to optimal routes is fast). The embodiments of the invention enable a simple mechanism for a handover of the end-user by reducing signaling overhead. The state (PIT entries) transfer from the first access point to the other access point is relatively small, and the transfer impacts a minimal number of nodes (e.g., routers and gateways) in the CCN.

Embodiments of the invention provide a method in a first CCN access point of a CCN network of enabling seamless mobility of a mobile device in the CCN network. According to some embodiments, the first access point keeps user identification information as an extension of the CCN PIT entries. The first CCN access point detects a handover initiation event, and responsive to detecting the handover initiation event, starts transmission of pending interests associated with the mobile device to a group of CCN access points. The pending interests associated with the mobile device are determined based on the user identification information kept with the CCN PIT entries corresponding to the pending interests. Upon initiation of the handover, this information is migrated to the new access point. The first access point further detects a handover completion event; and in response stops the transmission of the pending interests associated with the mobile device. Following the receipt of the pending interests a second CCN access point from the group of access points stores the pending interests in its PIT and is able to process and forward content objects to the mobile device associated with the pending interests that were initiated at the first access point prior to the handover initiation.

To achieve a seamless transfer, the CCN network routing state is transferred to other network devices to ensure that CCN replies in response to the migrating end-user device's CCN requests are redirected to the new access point that the end-user device has roamed to.

FIG. 1 is a diagram of one example of an architecture of a content centric networking (CCN) network. The CCN network in this example is an access network 101. The access network 101 is in communication with a set of separately administered networks including a home/enterprise network, the Internet and a mobile network 102 (e.g., 3GPP/LTE, 3G, WiFi, or a heterogeneous access technologies (D2D, Micro/Macro cell simultaneous connectivity etc). The example shows that the access network 101 can be further in communication with any number of additional CCN networks, IP networks or other types of networks. In some embodiments, the mobile network 102 is part of the same CCN network as the access network 101. In this example, the access points 102A and 102B are CCN enabled access points (i.e., they support a CCN stack and are able to receive, process CCN interest packet requests and content objects). In this example, the access network and the access points 102A and 102B implement the CCN handover described further herein below and are provided by way of example and not limitation. A CCN network can be utilized in other contexts such as home networks, enterprise networks, or similar independently administered public or private networks.

The access network can have any number of nodes and can utilize any combination of layer 1 and layer 2 protocols for communication between the CCN nodes of the access network 101. The CCN nodes may be implemented by network devices (ND), as discussed further herein below. The CCN nodes include a set of CCN routers 117 and CCN gateways (GW) 103. The CCN routers 117 and CCN gateways 103 manage CCN interest packets, forwarding these packets toward the corresponding content server 113 and managing the content response messages (i.e. content objects) by forwarding them toward the requesting user equipments 105A-B. The CCN access points 102A and 102B can be any access point of a mobile network allowing the connection of the mobile device 105B to the network (e.g., CCN access network 101). The access points can be any one of a base station, an antenna, eNodeB in an LTE network, a wireless access point in a Wi-Fi network. In some embodiments, the CCN access points 102A, 102B can be a Serving Gateway, or a Packet Data Network Gateway (PGW) of an LTE network. The access points (102A-B) are CCN-aware (i.e., they can parse and understand CCN messages). The access points can thus act as CCN routers for mobile devices (e.g., mobile device 105B) and delegate requests to the CCN network infrastructure (e.g., CCN access network 101). The access points deliver back CCN replies to the mobile devices. The mobile network 102 and the access network 101 handle the detection and management of handovers of mobile devices between the different access points (e.g., the handover of the mobile device 105B between the access point 102A and the access point 102B).

The CCN nodes that communicate with the user equipment 105A-B in the separately administered networks are the CCN gateways 103. The user equipment 105A-B can be any type of user device including mobile devices, laptop computers, desktop computers, console devices, workstations and similar computing devices. The user equipment 105B will be referred herein below as a mobile device by way of example and not limitation, and it can be any type of user equipment with mobile capabilities (enabled to wirelessly connect to a mobile network). The CCN access points 102A-B, CCN routers 117, and CCN GW 103 identify users of the user equipment 105A-B and apply handover processes for enabling seamless mobility as it will be described in further details with reference to FIGS. 2-9. In some embodiments, the access points are located in a relatively close geographical area, while in other embodiments the access points are not necessarily immediate physical neighbors.

The content server 113 can be any computing device in communication with the access network 101. The access network 101 can be in communication with any number and variety of content servers 113. The content server 113 can be a server or similar computing device that hosts a set of services and resources such as data stores including web pages, audio/visual content, documents and similar static and/or dynamically generated data.

According to embodiments of the present invention, the data traffic forwarding in CCN is performed at each CCN node (e.g., the CCN routers, CCN GW, and the CCN access points) as explained below with an example sequence:

1. A CCN interest packet arrives through a network interface.

2. The CCN node checks whether it has the requested content object named in the CCN interest packet stored in its content store (CS).

3. If the Content object is found in the CS, then the process proceeds to step 7.

4. If the Content object is not found in the CS, then a check is made whether the same content has already been requested, by looking for an entry in a pending interest table (PIT) that matches the CCN name of the content object.

5. If a matching PIT entry is found, then the matching PIT entry is updated by adding a reference to (e.g., an indicator/identifier for) the network interface through which the CCN interest packet was received. In addition the matching PIT entry is updated by adding a user identification (UserID) associated with the mobile device that requested the CCN Name. In this case, the process then exits.

6. If no matching PIT entry is found, then a new entry is created in the PIT for the CCN name, and the CCN interest packet is forwarded toward the content server according to CCN name prefix matching using the FIB. The newly added PIT entry includes the user identification (UserID) of each mobile device that requested the associated CCN Name.

7. When a Content object arrives through a network interface in a CCN response packet, then the CCN response packet is forwarded to each of the network interfaces listed (e.g., referenced, identified) in the related PIT entry. If the Content object was found in the content store, then the content object is forwarded to the network interface over which the corresponding CCN interest packet was received.

Seamless Handover at the Access Point Level

Figure 2:
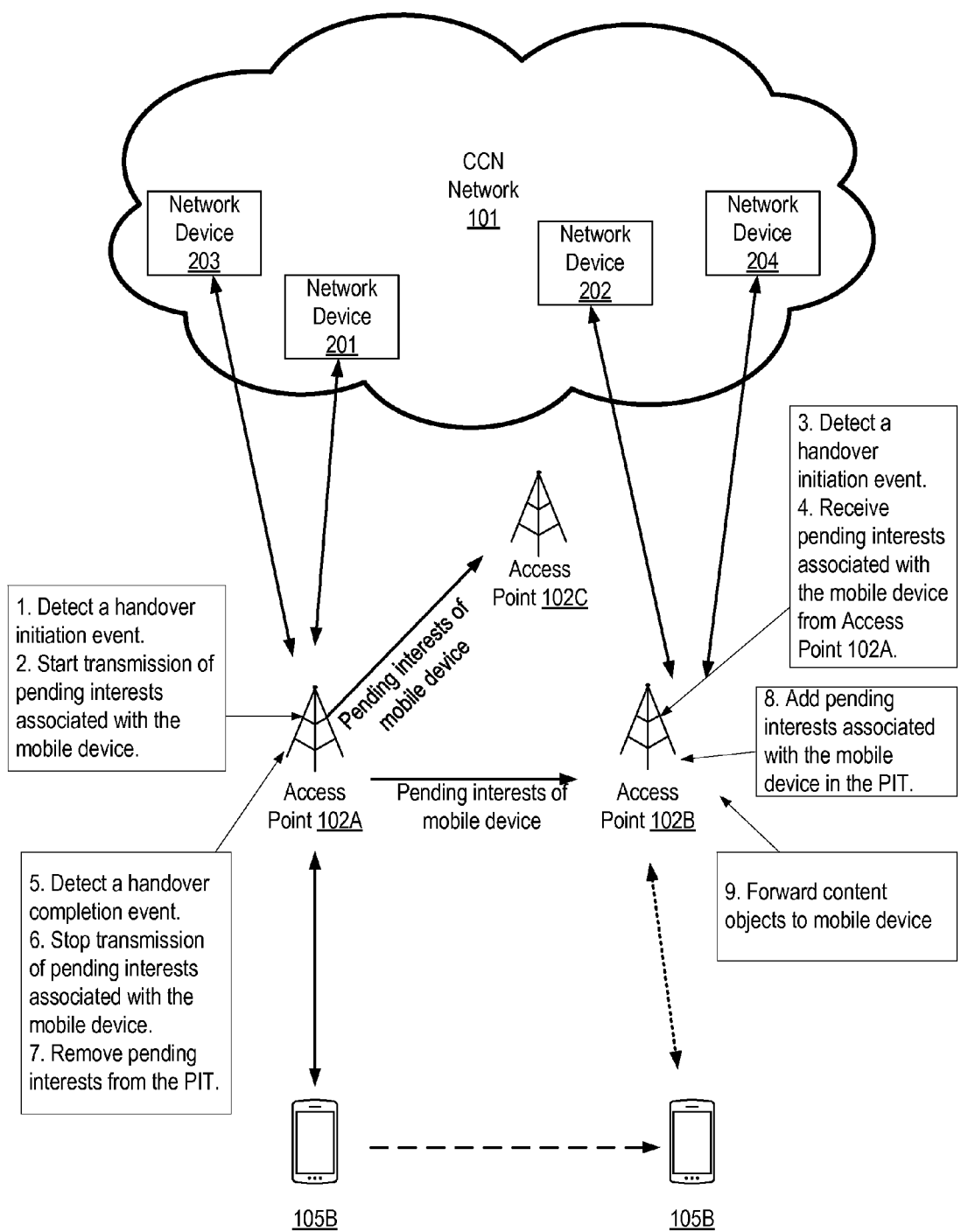
FIG. 2 illustrates a block diagram of operations performed in a CCN network for enabling seamless handover from a first access point to a second access point in the CCN network according to some embodiments of the invention.

FIG. 2 illustrates a block diagram of operations performed in a CCN network for enabling seamless handover from a first access point to a second access point in the CCN network according to some embodiments of the invention.

The network devices 201-204 may be any of the CCN routers (e.g., router 117) or gateways of the access network 101 of FIG. 1. The access points 102A, 102B, 102C are described with respect to FIG. 1, and are elements of the mobile network 102 coupled with the CCN network 101. The mobile device 105B is connected wirelessly to the CCN network 101 through the first access point 102A. In some embodiments, a central controller (not shown in FIG. 2) serves to co-ordinate and manage the various access points (e.g., access point 102A and 102B), and to handle detection of mobile device mobility.

In some embodiments, the access points can be multi-homed with multiple gateways acting as entry points into the CCN network. In the illustrated embodiment, the access point 102A is coupled with the network device 201 as well as with the network device 203. Each one of the network devices (201, 203) may act as an entry point into the CCN network 101 for the mobile device 105B connected to the access point 102A. The choice between the network device 201 or 203 may be based on policy decisions of the network with respect to on one or more parameters such as the identification of the user of the mobile device (UserID), the identification of the mobile device, or a uniform resource identifier (URI) or similar identifier for a requested content object. While embodiments of FIG. 2 are described with each access point (102A, 102B) coupled with two network devices ((201,203) and (202,204) respectively), each access point may be coupled to a different number of network devices (where this number is at least one). Therefore, embodiments of the invention are not limited to the illustrated embodiments. Some embodiments will be described with each access point being coupled with one network device (e.g., FIG. 4, FIG. 6). Although embodiments described below may be described with a single network device coupled with a single access point, the embodiments of the invention are not so limited and the mechanisms described below apply to a multi-homed solution as well (i.e., to an access point coupled with multiple network devices).

Referring back to FIG. 1, at task box 1, the access point 102A detects a handover initiation event. In some embodiments, the CCN Layer of the access point detects that a handover initiation event occurred indicating that a lower level Layer is initiating a handover procedure (i.e., a handover negotiation) with one or more other access points. The handover initiation event may be due to the physical layer of the access point 102A or the access point 102B initiating a handover protocol in response to detecting a handover condition being satisfied (e.g., a signal received from the mobile device is too weak, the access point 102A being over-subscribed (used), the access point 102B detecting a strong signaling from the mobile device 105B and requesting a handover from the access point 102A). The handover protocol may be any protocol or procedure in place in the mobile network (e.g., 3G, 3GPP/LTE, WiFi, or any infrastructure allowing wireless connection of the mobile device 105B) for enabling a handover of a mobile device from a first access point to another access point.

Upon detection of the handover initiation event, at task box 2, the access point 102A starts transmission of pending interests associated with the mobile device. The pending interests associated with the mobile device 105B are selected based on an identification associated with the mobile device (e.g., the userID of the mobile device). A copy of PIT entries associated with the pending interests is retrieved from the pending interest table (PIT) of the access point 102A based on the userID of the mobile device 105B.

The userID may be an International Mobile Station Equipment Identity (IMEI), WLAN MAC address, or any identifier which uniquely identifies the device of the user in the mobile network. In some embodiments, PIT entries associated with the mobile device 105B existing before the initiation of the handover procedure and new PIT entries established during the execution of the handover procedure are selected to be transferred to one or more access points.

In one embodiment, the access point 102A sends a copy of its PIT entries associated with the mobile device 105B to the access point 102B (the access point 102B being the access point toward which the handover of the mobile device 105B is initiated). In other embodiments, the access point 102A sends a copy of the PIT entries to a group of access points including at least the access point 102B (e.g., to access point 102B and 102C). In these embodiments, since the handover procedure at the CCN level is performed concurrently with the handover procedure at lower layer levels (e.g., the radio resource and bearer level), the next access point at which the mobile device 105B will connect (at the completion of the handover) might not be known at the initiation of the handover process. In some of these embodiments, the final access point will only be known at the end of the handover process. Thus the PIT entries are sent to a group of access points which could potentially receive and service the mobile device 105B. In a non-limiting exemplary embodiment, this scenario applies in a multi-tier access point coverage scenario (e.g., multiple WiFi or microcell spanned within a wider cellular coverage). In another exemplary embodiment, this scenario can apply when the user of the mobile device 105B is moving towards a border where another adjacent cell might offer a better signal strength (e.g., 102B instead of 102C). Although only two access points (102B, and 102C) are described with reference to the group of access points, more access points may receive the PIT entries associated with the mobile device 105B from the access point 102A.

At task box 3, access point 102B detects a handover initiation event. In some embodiments, the CCN Layer of the access point 102B detects that a handover initiation event occurred which indicates that a lower level layer is initiating a handover procedure (i.e., a handover negotiation) with one or more other access points. The handover initiation event may be due to the physical layer of the access point 102A or the access point 102B initiating a handover protocol in response to detecting that a handover condition being met (e.g., a signal received from the mobile device is too weak, the access point 102A being over-subscribed, the access point 102B detecting a strong signaling from the mobile device 105B and requesting a handover from the access point 102A). The handover protocol may be any protocol or procedure in place in the mobile network (e.g., 3G, 3GPP/LTE, WiFi, or any infrastructure allowing wireless connection of the mobile device 105B) for enabling a handover of a mobile device from a first access point to another access point.

At task box 4, the access point 102B receives the pending interests associated with the mobile device 105B from the access point 102A. In some embodiments, the access point 102C receives the same pending interests associated with the mobile device 105B received at the access point 102B. In some embodiments, the pending interests are a list of copies of access point 102A's PIT entries associated with the userID of the mobile device 105B. In some embodiments, PIT entries associated with the mobile device 105 existing before the initiation of the handover procedure and new PIT entries established during the execution of the handover procedure are received at the access point 102B.

At task box 5, the access point 102A detects a handover completion event. In some embodiments, the CCN Layer of the access point 102 detects that a handover completion event occurred which indicates that the lower level layer has completed the handover procedure (i.e., a handover negotiation) and the mobile device is now connected to the network via another access point (e.g., access point 102B). The handover completion event may be due to the physical layer of the access point 102B accepting the handover from the access point 102A and initiating connection of the mobile device 105B to the network 101. The handover protocol may be any protocol or procedure in place in the mobile network (e.g., 3G, 3GPP/LTE, WiFi, or any infrastructure allowing wireless connection of the mobile device 105B) for enabling a handover of a mobile device from a first access point to another access point.

At task box 6, upon detection of the completion of the handover, the access point 102A stops transmission of pending interests associated with the mobile device 105B. In some embodiments, at task box 7, the access point 102A may remove any pending interests stored in its PIT which are associated with the mobile device 105B. The operations of task box 7 are optional and in some embodiments they may not be performed (i.e., the pending interests will not be removed from the PIT of the access point 102A following the completion of the handover).

At task box 8, the access point 102B is configured to add the received pending interests associated with the mobile device 105B in its PIT. Each one of the added PIT entries includes an identification of the mobile device 105B (e.g., the userID of the mobile device 105B). In some embodiments, the pending interests are only added to the access point 102B which has accepted the handover of the mobile device. In alternative embodiments, other access points (e.g., access point 102C) may also add the pending interests associated with the mobile device and received from the access point 102A to their respective PIT.

In some embodiments, once the access point 102B has added the pending interests of the mobile device 105B in its PIT, access point 102B is operative to forward (task box 9) content objects corresponding to these pending interests to the mobile device 105B. In some embodiments, access point 102B may perform the following operations according to CCN traffic handling with the following sequence:

a. For each one of the PIT entries added to the PIT of the access point 102B, the CCN access point 102B checks whether it has the requested content object named in the PIT entry stored in its content store (CS).

b. If the content object is found in the CS, then a CCN response packet is forwarded to each of the network interfaces listed (e.g., referenced, identified) in the related PIT entry and associated with the userID of the mobile device 105B.

c. If the content object is not found in the CS, in some embodiments, the access point 102B resubmits the interest requests of the newly added PIT entries to the network (e.g., to one or more network devices of the CCN network which may include the access point 102A) to retrieve the content object corresponding to these interest requests. In other embodiments, the access point 102B does not perform any additional operation and the CCN network is reconfigured to forward the content objects to the access point 102B instead of the access point 102A even if the interest requests originated from the access point 102A. These two embodiments will be described in further details with reference to FIGS. 4-5 and FIGS. 6-7 below.

d. When a content object arrives through a network interface in a CCN response packet, it is forwarded (task box 9) to the mobile device 105B.

The operations in the flow diagram of FIG. 3 will be described with reference to the exemplary embodiments of FIG. 2. However, it should be understood that the operations of the flow diagram can be performed by embodiments of the invention other than those discussed with reference to the FIG. 2, and the embodiments of the invention discussed with reference to FIG. 2 can perform operations different than those discussed with reference to the flow diagram of FIG. 3.

FIG. 3 is a flow diagram illustrating operations 300 performed in a first Content Centric Networking (CCN) access point of a CCN network of enabling seamless mobility of a mobile device in the CCN network in accordance with some embodiments. At block 302, the first CCN access point (e.g., 102A) detects a handover initiation event. The handover initiation event is an indication that a handover of a mobile device (e.g., 105B) from the first CCN access point 102A to a second CCN access point 102B from a group of one or more access points (e.g., 102B, and 102C) is initiated. The detection of the handover initiation event may be performed as described with respect to embodiments of task box 1 of FIG. 2. Flow then moves to block 304.

At block 304 the first CCN access point 102A selects the pending interests associated with the mobile device 105B based on an identification associated with the mobile device. The pending interests are represented with pending table entries from the PIT of the access point 102A, which include an identification of the mobile device 105B (e.g., the userID of the mobile device). In some embodiments the PIT entries include entries created and stored in the PIT of the access point 102A prior the initiation of the handover as well as during the execution of the handover procedure. These PIT entries are the result of interests requests generated by the mobile device 105B before the handover procedure started and during the execution of the handover procedure. These PIT entries has not yet been responded to by the network. Flow then moves to block 306.

At block 306, the CCN access point 102A responsive to detecting the handover initiation event, starts transmission, to the group of one or more access points, of one or more pending interests associated with the mobile device. In some embodiments, copies of the PIT entries selected, at block 304, are transmitted to multiple access points (e.g., 102B, and 102C), where each access point is a candidate to the handover process. The transmission of the selected PIT entries may be performed as described with respect to embodiments of task box 2 of FIG. 2. Flow then moves to block 308.

At block 308, the CCN access point 102A detects a handover completion event. In some embodiments, the CCN Layer of the access point 102A detects that a handover completion event occurred, which indicates that the lower layer level has completed the handover procedure (i.e., a handover negotiation) and the mobile device 105B is now connected to the network via another access point (e.g., access point 102B). The detection of the handover completion may be performed as described with respect to embodiments of task box 5 of FIG. 2. Flow then moves to block 310.

At block 310, the CCN access point 102A stops, in response to detecting the handover completion event, the transmission of the one or more pending interests associated with the mobile device. The mobile device is connected to a new access point (e.g., access point 102B) and any new interest request is sent to the access point 102B directly from the mobile device 105B. Thus the access point 102A stops transmission of PIT entries associated with the mobile device 105B to the multiple access points (this may be performed as described with reference to task box 6 of FIG. 2). According to some embodiments, at this point, the handover of the mobile device 105B from the access point 102A to the access point 102B is complete and the access point 102B can handle traffic to/from the mobile device 105B. Due to the installation of the PIT entries associated with the mobile device 105B at the access point 102B, the user of the mobile device 105B experience a seamless handover without any loss of data or error occurring during the handover. Any interest request initiated by the mobile device 105B during its connection to the access point 102A, and which was not yet answered will be transferred to the access point 102B. The access point 102B may then forward messages which respond to these requests. The state (PIT entries) transfer from the first access point to the second access point is relatively small, and impacts a minimal number of nodes (e.g., routers and gateways) in the CCN network rendering the handover mechanism of the mobile device to be simple and efficient.

In some embodiments, additional operations may be performed at the access point 102A, following the transmission of the PIT entries to the other access points. At block 312, the CCN access point 102A may remove the transmitted pending interests from its pending interest table. This operation is optional and in some embodiments it is not performed.

Seamless Mobility at the Network Device Level

Figure 4:
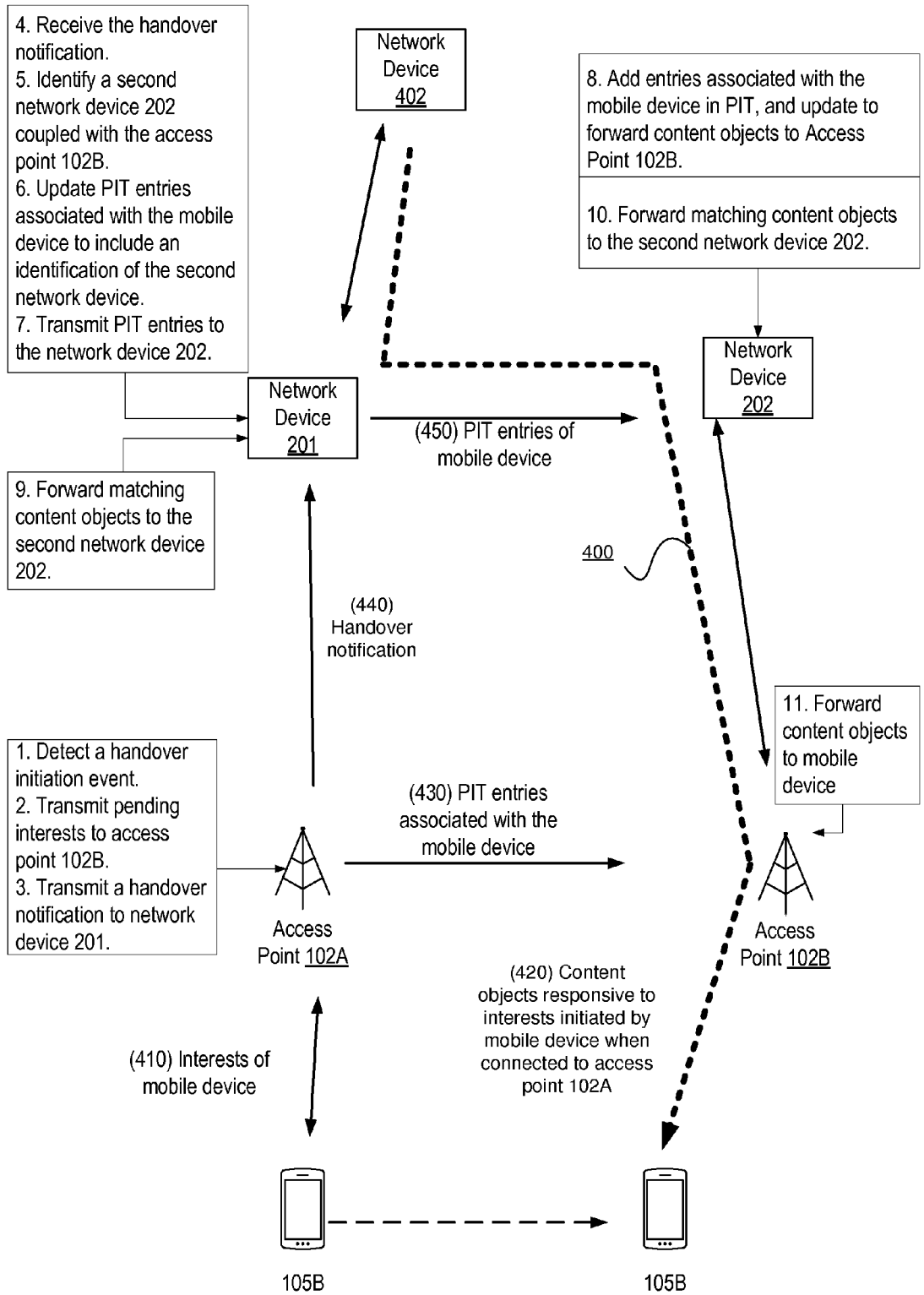
FIG. 4 illustrates a block diagram of reconfiguration of network devices in a CCN network for enabling seamless handover of a mobile device according to some embodiments of the invention.

From a CCN network perspective, the control plane (including routing table information) reconfigures network elements of the CCN network 101 (e.g., network device 201, and/or network device 202 of FIG. 4) to re-route any CCN replies intended for the moving mobile device 105B towards the new access point 102B. FIGS. 4/5 and FIGS. 6/7 illustrate two alternative mechanisms for reconfiguring the elements of the network to forward content objects to the mobile device 105B through the new access point 102B (where the content objects are in reply to interests requests initiated while the mobile device 105A was connected to the network through the access point 102A).

FIG. 4 illustrates a block diagram of reconfiguration of network devices in a CCN network for enabling seamless handover of a mobile device according to a first embodiment. The first access point 102A and the second access point 102B are connected to the network 101 through network devices 201 and 202 respectively. In this first embodiment, the network devices 201-202 are neighbors of each other (i.e., one hop away in the CCN network 101). In these embodiments, the network devices are configured by the control plane (not illustrated) to forward replies to the interests (410) of the mobile device 105B (initiated when the device was connected through the access point 102A) through the access point 102B along the path 400. In these embodiments, contrary to traditional CCN networks, the CCN replies do not follow the reverse path of the interest requests. In the illustrated example, the mobile device 105B sends interest requests (410) to the access point 102A, which are then sent to the network device 201 and to the network device 402. The replies of these requests (content objects 420) are received back at the mobile device 105B via the network device 402, the network device 201, the network device 202 and finally the access 102B at which the mobile device is connected at the completion of the handover procedure. Although not illustrated there may be additional network nodes along the path 400 and the access point 102B may be coupled with the network device 201 via intermediary network nodes.

At task box 1, the access point 102A detects a handover initiation event for the mobile device 105B. At task box 2, the access point 102A transmits the PIT entries associated with this device to the access point 102B. In some embodiments, task box 1 and 2 of FIG. 4 are performed similarly to embodiments described with respect to FIG. 2 (which may include task box 1-2, and 5-7 of FIG. 2). At task box 3, the access point 102A transmits a handover notification to network device 201. The handover notification 440 indicates that the mobile device 105B is moving and will be connected to the network via the access point 102B.

At task box 4, the network device 201 receives the handover notification and identifies, at task box 5, a second network device 202 coupled with the access point 102B and with the network device 201. At task box 6, the PIT entries associated with the mobile device 105B in the PIT of the network device 201 are updated to include the identification of the second network device (202). In some embodiments, these PIT entries are configured to have an outgoing interface pointing to the destination network device 202. According to some embodiments, the first network device 201 is operative to identify the network device 202 as it stores a list of CCN network devices (e.g., routers) that act as a gateway to the CCN network infrastructure as well as a list of their one-hop CCN network device neighbors. Thus, the network device 201 is operative to identify the network device 202 coupled with the access point 102B to which the mobile device connects at the completion of the handover. At task box 7, the network device 201 transmits a copy of the PIT entries (PIT entries 450) associated with the mobile device 105B to the network device 202.

At task box 8, the new network device 202 is configured to add the PIT entries associated with the mobile device 105B in its pending interest table. The outgoing interface of each of the PIT entries is set to direct responses to the new access point 102B. Although not illustrated in FIG. 4, the access point 102B has also received PIT entries (430) associated with the mobile device from the access point 102A. This operation may be performed as described with embodiments of task box 3, 4, and 8 of FIG. 2.

Following the reconfiguration of the network device 201, the network device 202 and the access point 102B, content objects responsive to the interests (410) initiated by the mobile device 105B when connected to the access points 102B are forwarded according to the path 400 (task box, 9, 10 and 11). The forwarding of the content objects may be performed as described with respect to the following operations:

a. For each one of the PIT entries added to the PIT table of a network node (network device or access point), the network node checks whether it has the requested content object named in the PIT entry stored in its content store (CS).

b. If the Content object is found in the CS, then the CCN response packet is forwarded to each of the network interfaces listed (e.g., referenced, identified) in the related PIT entry and associated with the userID of the mobile device 105B (e.g., the network device will forward to network device 202, the network device 202 will forward responses to access point 102B and the access point 102B to the network device).

c. If the Content object is not found in the CS, it is forwarded upon its arrival at the network node and according to the network interfaces listed as described with operation (b) above.

The operations in the flow diagram of FIG. 5 will be described with reference to the exemplary embodiments of FIG. 4. However, it should be understood that the operations of the flow diagram can be performed by embodiments of the invention other than those discussed with reference to the FIG. 4, and the embodiments of the invention discussed with reference to FIG. 4 can perform operations different than those discussed with reference to the flow diagram of FIG. 5.

Figure 5:
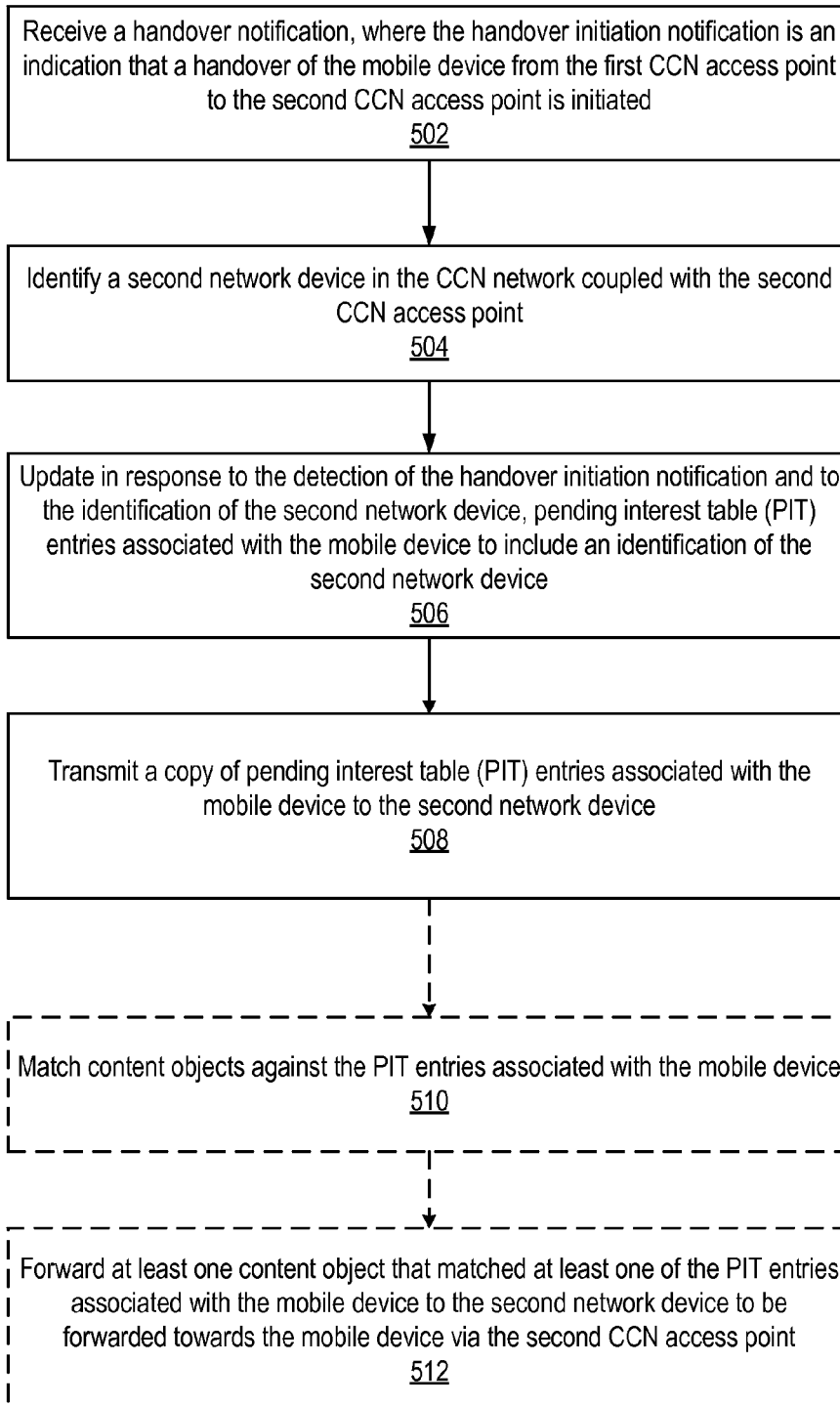
FIG. 5 is a flow diagram illustrating operations performed in a network device of a CCN network of enabling seamless mobility of a mobile device in the CCN network according to some embodiments of the invention.

FIG. 5 is a flow diagram illustrating operations (500) performed in a network device of a CCN network of enabling seamless mobility of a mobile device in the CCN network in accordance with some embodiments. At block 502, a network device (e.g., network device 201) receives a handover initiation notification. In some embodiments, the handover notification is received from the access point 102A. The handover initiation notification is an indication that a handover of the mobile device 105B is performed from the first CCN access point 102A to the second CCN access point 102B. At block 504, the first network device 201 identifies a second network device 202 in the CCN network coupled with the second CCN access point 102B. At block 506, Update in response to the detection of the handover initiation notification and to the identification of the second network device, pending interest table (PIT) entries associated with the mobile device to include an identification of the second network device 202. In some embodiments, these PIT entries are configured to have an outgoing interface pointing to the destination network device 202. According to some embodiments, the first network device 201 is operative to identify the network device 202 as it stores a list of CCN network devices (e.g., routers) that act as a gateway to the CCN network infrastructure as well as a list of their one-hop CCN network device neighbors. Thus, the network device 201 is operative to identify the network device 202 coupled with the access point 102B to which the mobile device connects at the completion of the handover.

At block 508, the network device 201 transmits PIT entries associated with the mobile device 105B to the second network device 202 to be added in its pending interest table. The outgoing interface of each of the PIT entries is set to direct responses received at the network device 202 to the new access point 102B at which the mobile device 105B is connected at the completion of the handover.

Once the PIT entries of the network device 201 associated with the mobile device 105B are updated, the network device 201 may match content objects against the PIT entries associated with the mobile device, at block 510. At block 512, the network device 201 forwards the content objects that match the PIT entries associated with the mobile device, to the second network device 202 to be forwarded towards the mobile device 105B. Similarly the network device 202 matches and forwards content objects responsive to the PIT entries associated with the mobile device 105B to the access point 102B to be forwarded to the mobile device 105B.

Figure 6:
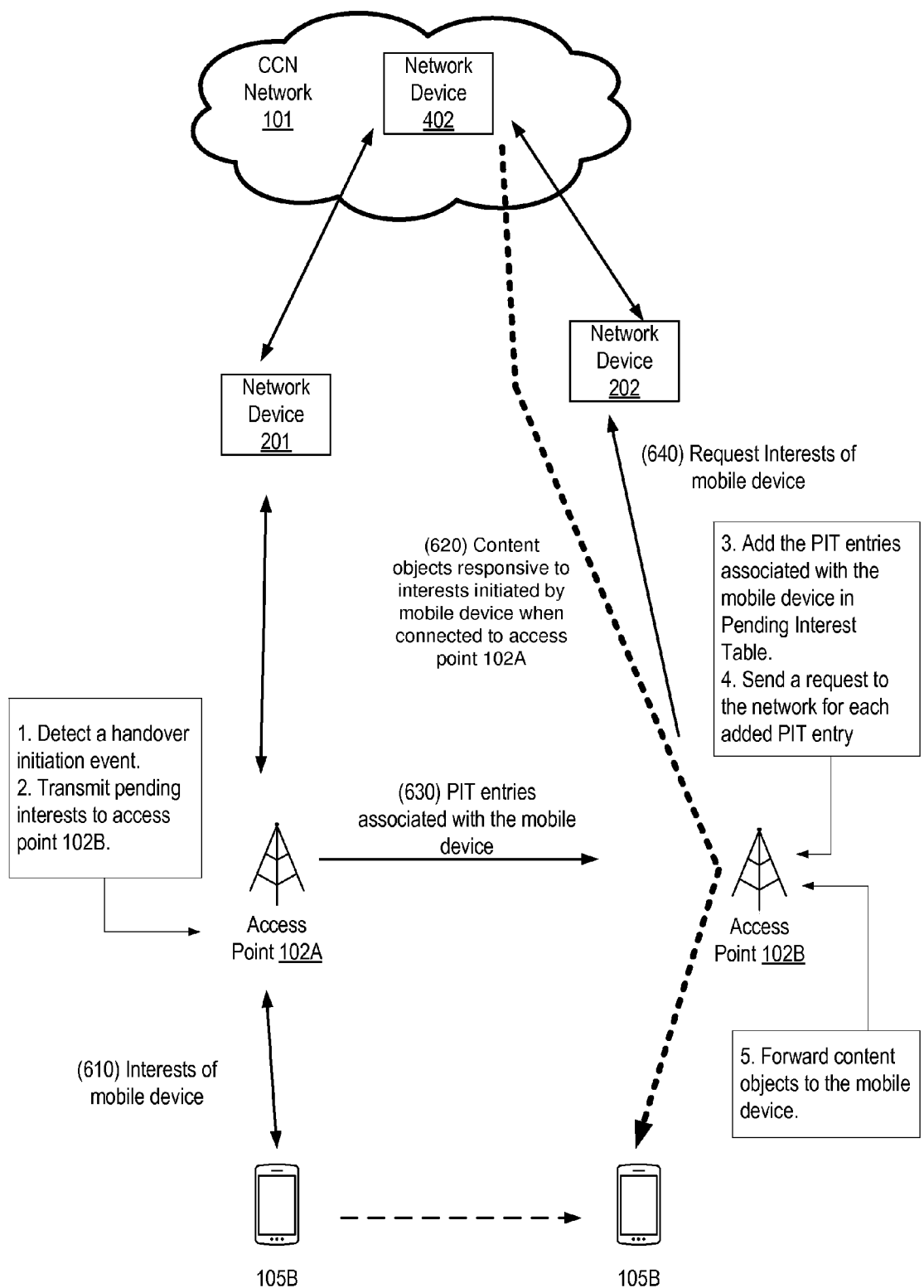
FIG. 6 illustrates a block diagram of reconfiguration of network devices in a CCN network for enabling seamless handover of a mobile device according to a second embodiment.

FIG. 6 illustrates a block diagram of reconfiguration of network devices in a CCN network for enabling seamless handover of a mobile device according to a second embodiment. In this second embodiments, instead of having the network devices (201, 202) being reconfigured to redirect the responses of the interests of the mobile device to the access point 102B, the access point 102B resends interest requests to the network which will automatically set up optimal routes to the data. These embodiments will be described in further details with reference to FIG. 6 and FIG. 7.

At task box 1, the access point 102A detects a handover initiation event for the mobile device 105B. At task box 2, the access point 102A transmits the PIT entries (630) associated with this device to the access point 102B. These PIT entries are the result of the receipt of interest requests 610 from the mobile device 105B. In some embodiments, task box 1 and 2 of FIG. 6 are performed with similar operations as the embodiments described with respect to FIG. 2 (which may include task box 1-2, and 5-7 of FIG. 2).

At task box 3, the access point 102B adds the received PIT entries to the pending interest table of the access point 102B. At task box 4, the access point 102B sends a request (640) to the network for each added PIT entry. In some embodiments, requests are sent only for PIT entries which do not have their corresponding content objects already stored in the content store of the access point 102B. According to these embodiments, the interests are requested without the mobile device having to resend requests through the CCN access point 102B after the completion of the handover. In this embodiment, contrary to the first embodiment described with respect to FIGS. 4-5, the CCN network does not attempt to create and manipulate PIT entries of network devices (201, 202) to point to the appropriate neighbor CCN network device to forward CCN replies to the mobile device 105B. Instead, the network reconfigures the path of the replies within the network by having the access point 102B sending new CCN requests (640) for each CCN name present in said PIT entries associated with the mobile device, via a CCN gateway (e.g., the network device 202). This will automatically set up optimal routes to the data, and if the new path overlaps with the original path of the requests (when the mobile device was connected to the network through the access point 102A), the CCN cache would already have stored the replies along the way and the content will arrive quickly to the mobile device 105B. At task box 5, content objects are then forwarded to the mobile device.

This second embodiment, may be used in scenarios where the new access point (102B) is not an immediate neighbor of the access point 102A (or if their respective gateways (network device 201 and 202) are not neighbors in the CCN network 101). This may, for example, be the case when the mobile device 105B is in a high-speed train in which case the best choice for a new access point to handover the mobile device 105B is not the closest access point (this new access point can be deduced via the neighbor list that is stored on the access point connecting the mobile device prior to the handover).

Figure 7:
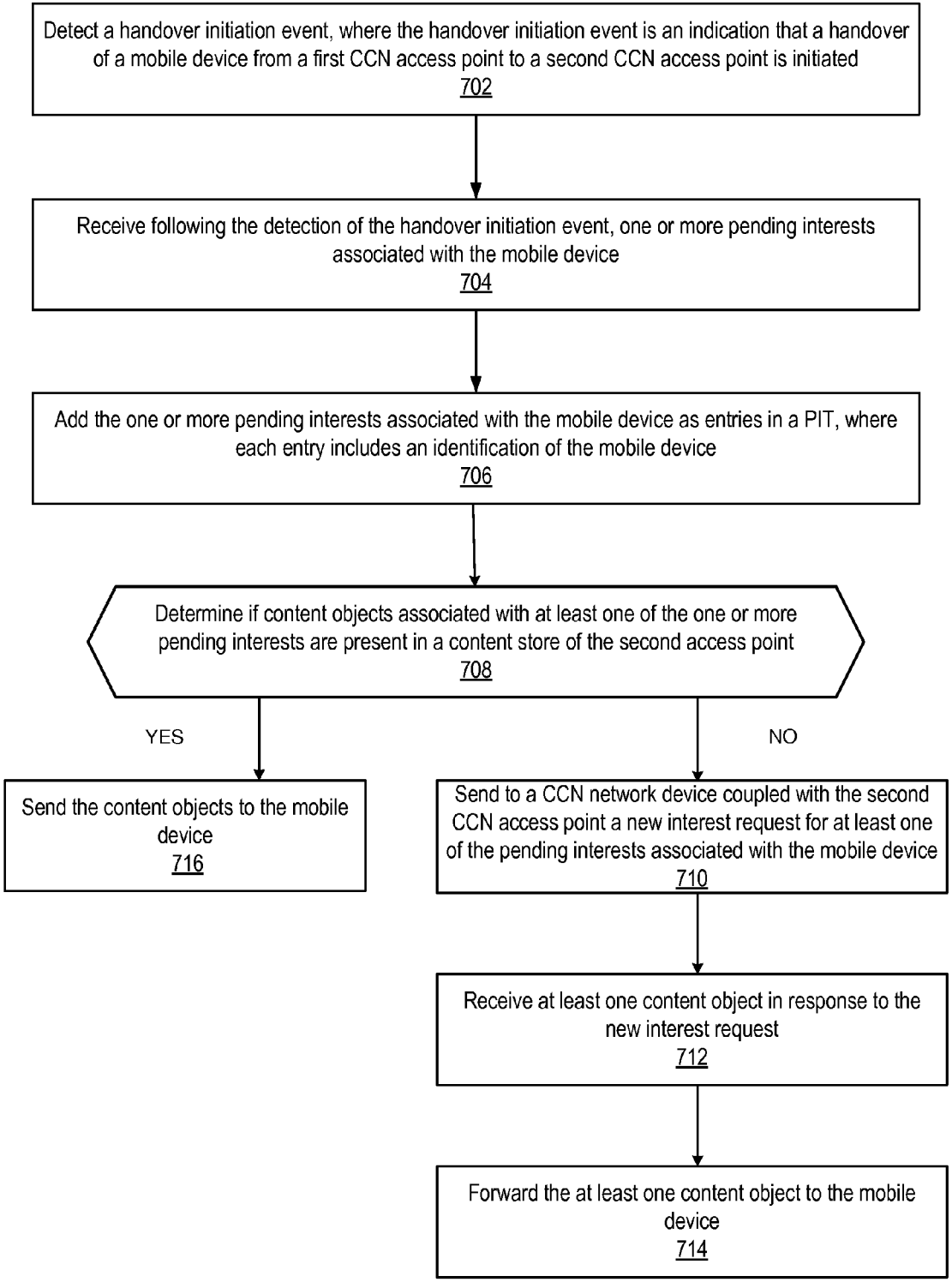
FIG. 7, is a block diagram illustrating operations performed, in a network node, for enabling seamless mobility of a mobile device in a CCN network, according to some embodiments of the invention.

FIG. 7 is a block diagram illustrating operations (700) performed, in a network node, for enabling seamless mobility of a mobile device in a CCN network, according to some embodiments. The network node (e.g., the new access point 102B) upon receipt of PIT entries from the access point 102A, sends new CCN requests for each CCN name present in these PIT entries, via its CCN gateway (the network device 202) as will be described with reference to operations of block 702-712.

At block 702, the access point 102B detects a handover initiation event, where the handover initiation event is an indication that a handover of a mobile device from the first CCN access point (102A) to the second (new) CCN access point 102B is initiated. At block 704, the access point 102B receives following the detection of the handover initiation event, one or more pending interests associated with the mobile device 105B. These pending interests are in the form of copies of PIT entries (from the PIT of the access point 102A), which were initiated while the mobile device was still connected to the network via the access point 102A. At block 706, the access point 102B adds the one or more pending interests associated with the mobile device as entries in a PIT, where each entry includes an identification of the mobile device 105B. In some embodiments, each newly received PIT entries in added to the PIT of the access point 102B with the userID of the mobile device 105B.

At block 708, the access point 102B determines if content objects associated with the pending interests are present in a content store of the second access point 102B. If the content store already includes the content objects, they are sent to the mobile device, at task (716) upon completion of the handover of the mobile device and its connection to the access point 102B. Alternatively, if the content store does not include the content objects, the access point 102B sends, at task box 710, to a CCN network device (e.g., a router reachable logically or physically) coupled with the second CCN access point 102B a new interest request for the at least one of the one or more pending interests associated with the mobile device. This will automatically set up optimal routes to the data (e.g., having a central network controller configuring the optimal route for the data), and if the new path overlaps with the original path of the requests, the CCN cache would already have stored the replies along the way and the content will arrive quickly to the mobile device 105B. At task box 712, the access point 102B will then receive at least one of the content objects in response to the new interest request; and forwards them, at task box 714, to the mobile device.

In some embodiments, the two mechanisms described above for reconfiguring the network devices to forward content objects to the mobile device upon its connection to a new access points (described with respect to FIG. 4 and FIG. 6) are exclusive to one another and are not used in combination. In alternative embodiments, the two mechanisms may be implemented concurrently and used in combination. When the two processes are used in combination, a trade-off can be obtained between sending new requests to find optimal paths versus quickly patching an already known and existing route as in the one-hop neighbor case. The embodiments described herein provides mechanisms for allowing clients to seamlessly receive CCN content while still roaming within the access layer infrastructure. The embodiments of the invention includes 1) identifying forwarding states (e.g., PIT entries) relevant to a CCN mobile device at the edge between the wireless access nodes and the CCN network, and 2) providing mechanisms to transfer and transform these forwarding states within the network to enable any CCN replies in-flight to be received at the new location that the client has moved over to.

While the block diagrams and the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Architecture

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 8A:
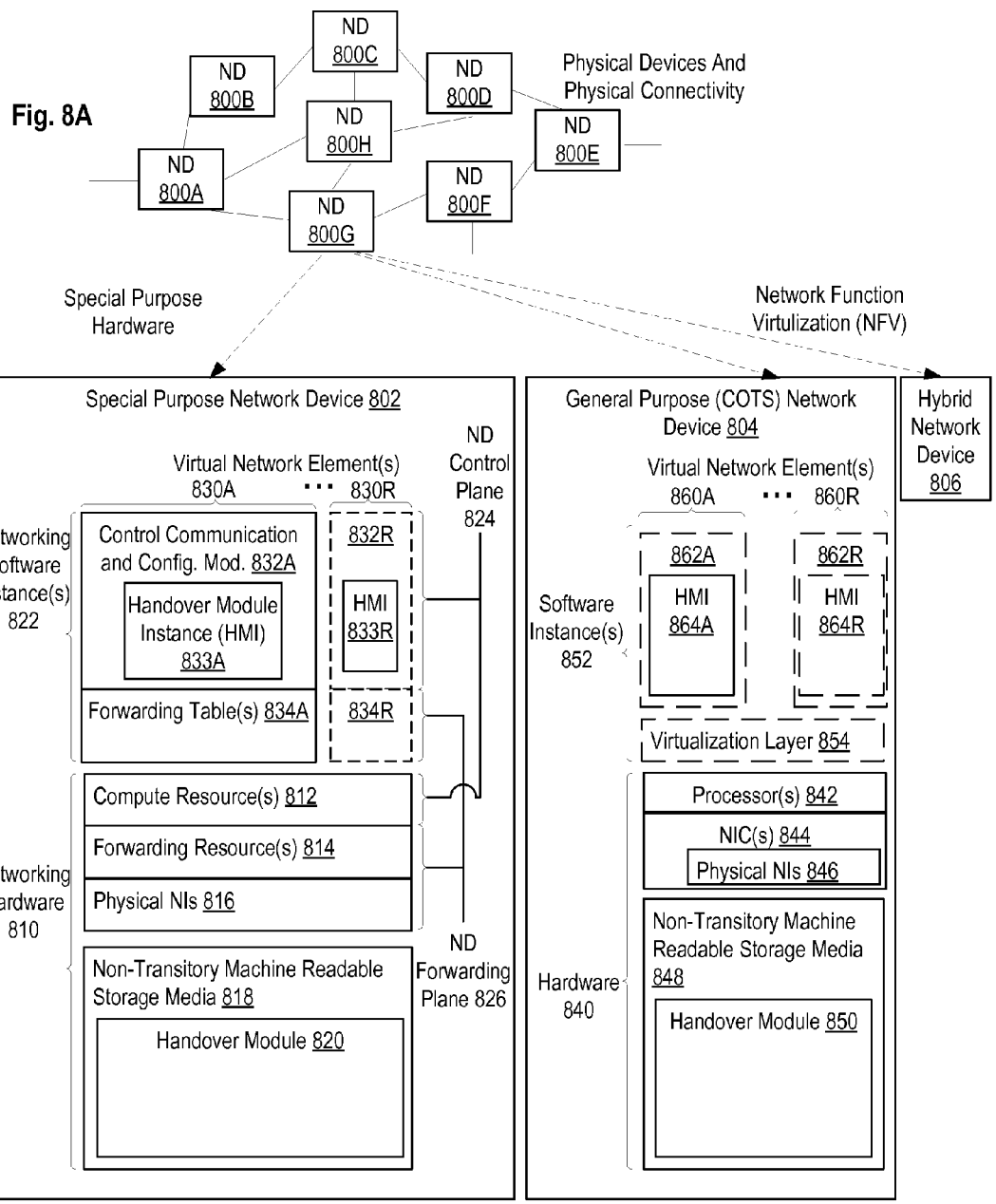
FIG. 8A illustrates connectivity between network devices (NDs) within an exemplary network, as well as three exemplary implementations of the NDs, according to some embodiments of the invention.

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 800A, E, and F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a proprietary operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the handover module 820 may be executed by the networking hardware 810 to instantiate a set of one or more handover module instances (HMI) 833A-R, which performs methods as discussed herein above in relation to FIGS. 1-7. Each of the HMI 833, and that part of the networking hardware 810 that executes that instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

The special-purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

Figure 8B:
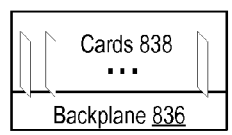
FIG. 8B illustrates an exemplary way to implement a special-purpose network device according to some embodiments of the invention.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850. During operation, the processor(s) 842 execute the handover module 850 to instantiate one or more sets of one or more applications 864A-R to perform the operations as described above with respect to FIGS. 1-7. While one embodiment does not implement virtualization, alternative embodiments may use different forms of virtualization represented by a virtualization layer 854 and software containers 862A-R. For example, one such alternative embodiment implements operating system-level virtualization, in which case the virtualization layer 854 represents the kernel of an operating system (or a shim executing on a base operating system) that allows for the creation of multiple software containers 862A-R that may each be used to execute one of the sets of applications 864A-R. In this embodiment, the multiple software containers 862A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 854 represents a hypervisor (sometimes referred to as a virtual machine monitor (VMM)) or a hypervisor executing on top of a host operating system; and 2) the software containers 862A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 864A-R, as well as the virtualization layer 854 and software containers 862A-R if implemented, are collectively referred to as software instance(s) 852. Each set of applications 864A-R, corresponding software container 862A-R if implemented, and that part of the hardware 840 that executes them (be it hardware dedicated to that execution and/or time slices of hardware temporally shared by software containers 862A-R), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 862A-R differently. For example, while embodiments of the invention are illustrated with each software container 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 862A-R to VNEs also apply to embodiments where such a finer level of granularity is used.

In certain embodiments, the virtualization layer 854 includes a virtual switch that provides similar forwarding services as a physical Ethernet switch. Specifically, this virtual switch forwards traffic between software containers 862A-R and the NIC(s) 844, as well as optionally between the software containers 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 8C:
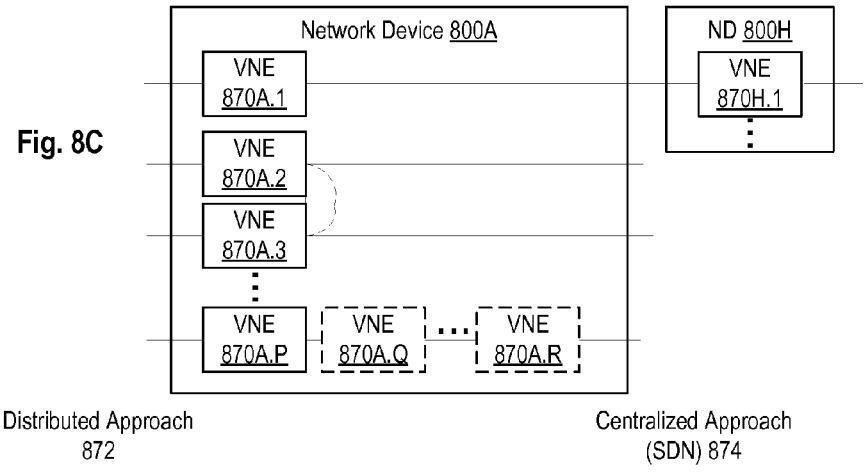
FIG. 8C illustrates various exemplary ways in which virtual network elements (VNEs) may be coupled according to some embodiments of the invention.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software containers 862A-R may operate as servers; the same would be true for the hybrid network device 806; in the case of the special-purpose network device 802, one or more such servers could also be run on a virtualization layer executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 8D:
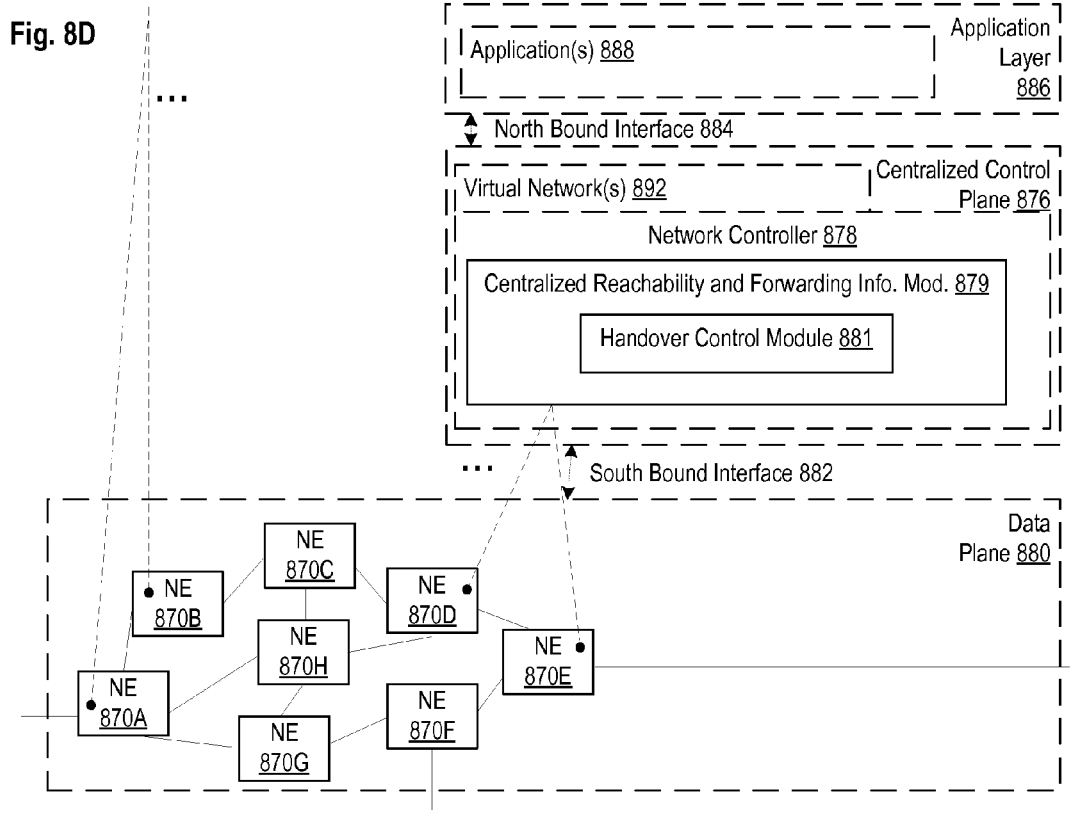
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 870A-H (e.g., the compute resource(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs. The network controller 878 contains a Handover Control Module (CSM) 881 which performs operations related to FIGS. 1-7. In some embodiments, the network controller 878 causes network devices of the network to be reconfigured to forward CCN response messages to a mobile device through a new access point following the handover of the mobile device from another access point to which it was connected. The response message being responsive to interest requests initiated when the mobile device was connected to the other access point.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the compute resource(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
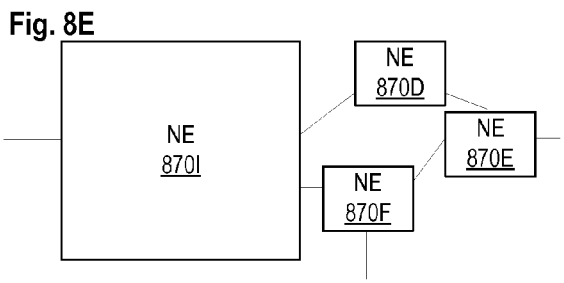
FIG. 8E illustrates the simple case of where each of the NDs implements a single NE, but a centralized control plane has abstracted multiple of the NEs in different NDs into (to represent) a single NE in one of the virtual network(s), according to some embodiments of the invention.
Figure 8F:
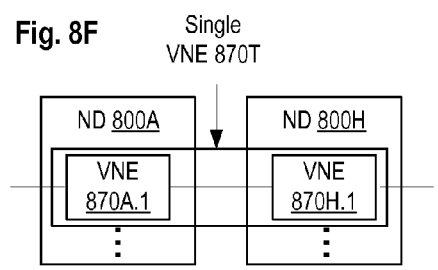
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 870I in one of the virtual network(s) 892 of FIG. 8D, according to some embodiments of the invention. FIG. 8E shows that in this virtual network, the NE 870I is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
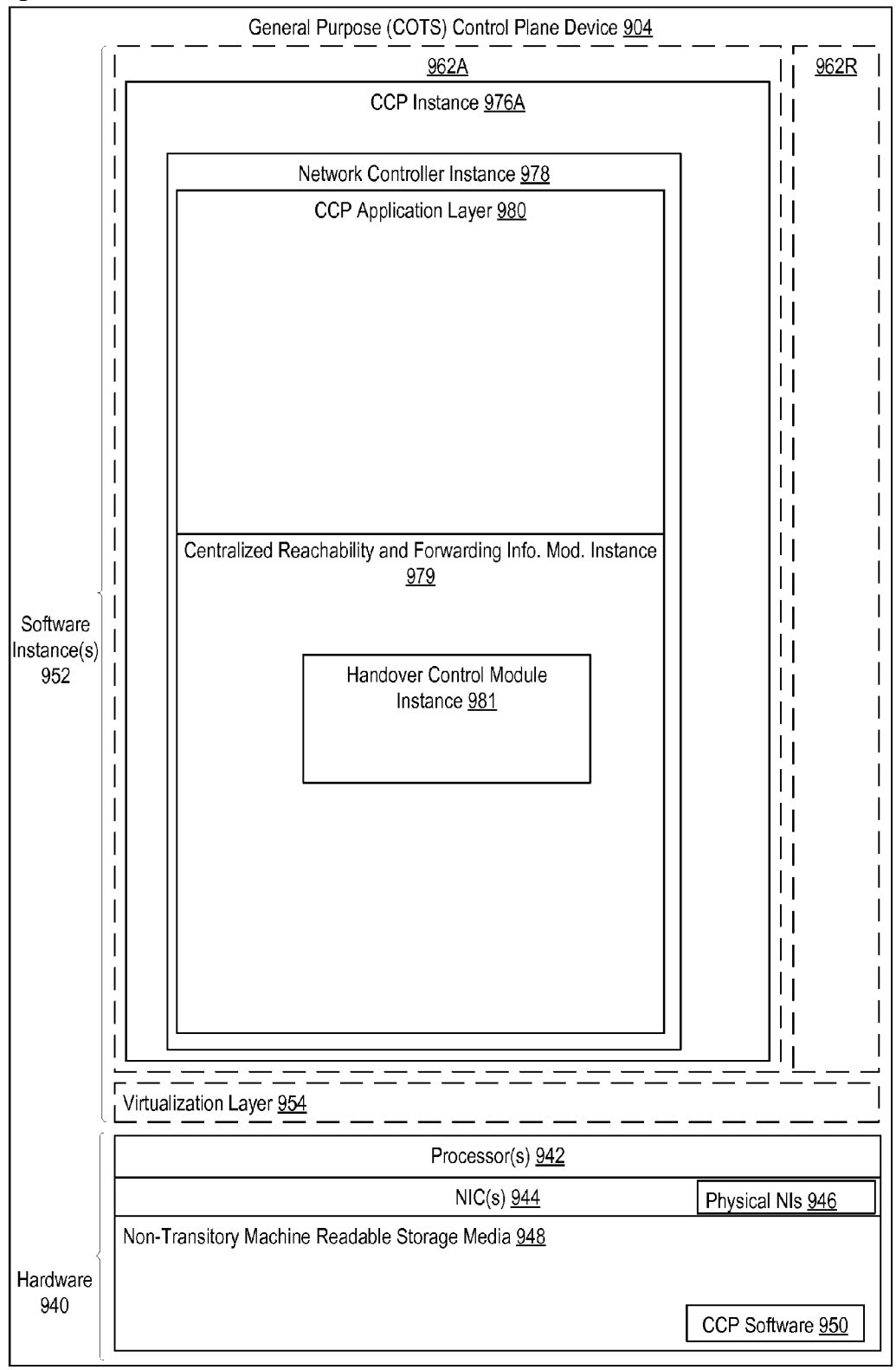
FIG. 9 illustrates a general purpose control plane device with centralized control plane (CCP) software 950), according to some embodiments of the invention.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein centralized control plane (CCP) software 950.

In embodiments that use compute virtualization, the processor(s) 942 typically execute software to instantiate a virtualization layer 954 and software container(s) 962A-R

(e.g., with operating system-level virtualization, the virtualization layer 954 represents the kernel of an operating system (or a shim executing on a base operating system) that allows for the creation of multiple software containers 962A-R (representing separate user space instances and also called virtualization engines, virtual private servers, or jails) that may each be used to execute a set of one or more applications; with full virtualization, the virtualization layer 954 represents a hypervisor (sometimes referred to as a virtual machine monitor (VMM)) or a hypervisor executing on top of a host operating system, and the software containers 962A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 950 (illustrated as CCP instance 976A) is executed within the software container 962A on the virtualization layer 954. In embodiments where compute virtualization is not used, the CCP instance 976A on top of a host operating system is executed on the "bare metal" general purpose control plane device 904. The instantiation of the CCP instance 976A, as well as the virtualization layer 954 and software containers 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user-interfaces). At a more abstract level, this CCP application layer 980 within the centralized control plane 876 works with virtual network view(s) (logical view(s) of the network) and the middleware layer provides the conversion from the virtual networks to the physical view. The network controller instance 978 contains a Handover Control Module Instance (CSM) 981 which performs operations related to FIGS. 1-7. In some embodiments, the network controller instance 978 causes network devices of the network to be reconfigured to forward CCN response messages to a mobile device through a new access point following the handover of the mobile device from another access point to which it was connected. The response message being responsive to interest requests initiated when the mobile device was connected to the other access point.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some NDs include functionality for authentication, authorization, and accounting (AAA) protocols (e.g., RADIUS (Remote Authentication Dial-In User Service), Diameter, and/or TACACS+(Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1 Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service) (RFC 4761 and 4762). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames. For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first Content Centric Networking (CCN) access point of a CCN network of enabling seamless mobility of a mobile device in the CCN network, the method comprising:
    detecting a handover initiation event, wherein the handover initiation event is an indication that a handover of the mobile device from the first CCN access point to a second CCN access point from a group of one or more CCN access points of the CCN network is initiated;
    responsive to detecting the handover initiation event, starting transmission, to the group of CCN access points, of one or more pending interests associated with the mobile device, wherein the one or more pending interests are stored as one or more entries of a pending interest table (PIT) in the first CCN access point;
    detecting a handover completion event; and
    stopping, in response to detecting the handover completion event, the transmission of the one or more pending interests associated with the mobile device.

2. The method of claim 1, further comprising selecting the one or more pending interests associated with the mobile device from a plurality of PIT entries, wherein the selecting is performed based on an identification associated with the mobile device.

3. The method of claim 2, wherein the CCN network is a Wi-Fi network and the first CCN access point and the group of CCN access points are Wi-Fi access points and the identification associated with the mobile device is a media access control (MAC) address of the mobile device.

4. The method of claim 2, wherein the CCN network is a cellular network and the first CCN access point and the group of CCN access points are base stations in the cellular network and the identification associated with the mobile device is an international mobile equipment identity (IMEI) identifying a mobile device.

5. The method of claim 1, wherein the one or more pending interests associated with the mobile device include one or more interests requested by the mobile device after the handover of the mobile device to the second CCN access point is initiated and prior a completion of the handover.

6. A method, in a first network device, of enabling seamless mobility of a mobile device in a Content Centric Networking (CCN) network, the method comprising:
    detecting a handover initiation event, wherein the handover initiation event is an indication that a handover of the mobile device from a first CCN access point to a second CCN access point of the CCN network is initiated;
    receiving, from a second network device and following the detecting of the handover initiation event, one or more pending interests associated with the mobile device; and
    adding the one or more pending interests associated with the mobile device as one or more entries in a pending interest table (PIT), wherein each of the one or more entries includes an identification associated with the mobile device.

7. The method of claim 6, wherein the first network device is the second CCN access point and the second network device is the first CCN access point.

8. The method of claim 7, further comprising, following the adding of the one or more pending interests in the PIT,
    responsive to determining that content objects associated with at least one of the one or more pending interests are not present in a content store of the second CCN access point, sending to a CCN router coupled with the second CCN access point a new interest request for the at least one of the one or more pending interests associated with the mobile device;
    receiving at least one of the content objects in response to the new interest request; and
    forwarding the at least one of the content objects to the mobile device.

9. The method of claim 8, wherein the sending is performed prior to completion of the handover of the mobile device from the first CCN access point to the second CCN access point.

10. The method of claim 6, wherein the first network device is a first CCN router coupled with the second CCN access point and the second network device is a second CCN router coupled with the first CCN access point.

11. A method, in a first network device of a content centric networking (CCN) network coupled with a first CCN access point, of enabling seamless mobility of a mobile device from the first CCN access point to a second CCN access point, the method comprising:
    receiving a handover initiation notification, wherein the handover initiation notification is an indication that a handover of the mobile device from the first CCN access point to the second CCN access point is initiated;
    identifying a second network device in the CCN network coupled with the second CCN access point; and
    updating, in response to detecting the handover initiation notification and to identifying the second network device, pending interest table (PIT) entries associated with the mobile device to include an identification of the second network device.

12. The method of claim 11, further comprising:
matching content objects against the PIT entries associated with the mobile device; and
forwarding at least one content object that matched at least one of the PIT entries associated with the mobile device to the second network device to be forwarded towards the mobile device via the second CCN access point.

13. The method of claim 11, further comprising:
transmitting a copy of the PIT entries associated with the mobile device to the second network device to be updated at the second network device for forwarding one or more content objects associated with the PIT entries towards the mobile device via the second CCN access point.

14. The method of claim 11, wherein the updating includes determining the PIT entries associated with the mobile device from a plurality of PIT entries stored in the first network device based on an identification associated with the mobile device.

15. A Content Centric Networking (CCN) access point of a CCN network, the CCN access point comprising:
a non-transitory computer-readable medium having a computer program code stored therein; and
a processor coupled to the non-transitory computer-readable medium, the processor operative to execute the computer program code to perform the following operations:
detecting a handover initiation event, wherein the handover initiation event is an indication that a handover of a mobile device from the CCN access point to another CCN access point from a group of one or more CCN access points of the CCN network is initiated,
responsive to detecting the handover initiation event, starting transmission, to the group of CCN access points, of one or more pending interests associated with the mobile device, wherein the one or more pending interests are stored as one or more entries of a pending interest table (PIT) in the CCN access point,
detecting a handover completion event, and
stopping, in response to detecting the handover completion event, the transmission of the one or more pending interests associated with the mobile device.

16. The CCN access point of claim 15, wherein the operations further comprise selecting the one or more pending interests associated with the mobile device from a plurality of PIT entries, wherein the selecting is performed based on an identification associated with the mobile device.

17. The CCN access point of claim 16, wherein the CCN network is a Wi-Fi network and the CCN access point and the group of CCN access points are Wi-Fi access points and the identification associated with the mobile device is a media access control (MAC) address of the mobile device.

18. The CCN access point of claim 16, wherein the CCN network is a cellular network and the CCN access point and the group of CCN access points are base stations in the cellular network and the identification associated with the mobile device is an international mobile equipment identity (IMEI) identifying a mobile device.

19. The CCN access point of claim 15, wherein the one or more pending interests associated with the mobile device include one or more interests requested by the mobile device after the handover of the mobile device to the another CCN access point is initiated and prior a completion of the handover.

20. A network device in a Content Centric Networking (CCN) network, the network device comprising:
a non-transitory computer-readable medium having a computer program code stored therein; and
a processor coupled to the non-transitory computer-readable medium, the processor operative to execute the computer program code to perform the following operations:
detecting a handover initiation event, wherein the handover initiation event is an indication that a handover of a mobile device from a first CCN access point to a second CCN access point of the CCN network is initiated,
receiving, from another network device and following the detecting of the handover initiation event, one or more pending interests associated with the mobile device, and
adding the one or more pending interests associated with the mobile device as one or more entries in a pending interest table (PIT), wherein each of the one or more entries includes an identification associated with the mobile device.

21. The network device of claim 20, wherein the operations further comprise, following the adding of the one or more pending interests in the PIT,
responsive to determining that content objects associated with at least one of the one or more pending interests are not present in a content store of the second CCN access point, sending to a CCN router coupled with the second CCN access point a new interest request for the at least one of the one or more pending interests associated with the mobile device;
receiving at least one of the content objects in response to the new interest request; and
forwarding the at least one of the content objects to the mobile device.

22. A network device of a content centric networking (CCN) network coupled with a first CCN access point, the network device comprising:
a non-transitory computer-readable medium having a computer program code stored therein; and
a processor coupled to the non-transitory computer-readable medium, the processor operative to execute the computer program code to perform the following operations:
receiving a handover initiation notification, wherein the handover initiation notification is an indication that a handover of a mobile device from the first CCN access point to a second CCN access point is initiated,
identifying another network device in the CCN network coupled with the second CCN access point, and
updating, in response to detecting the handover initiation notification and to identifying the another network device, pending interest table (PIT) entries associated with the mobile device to include an identification of the another network device.

23. The network device of claim 22, wherein the operations further comprise:
matching content objects against the PIT entries associated with the mobile device; and
forwarding at least one content object that matched at least one of the PIT entries associated with the mobile device to the another network device to be forwarded towards the mobile device via the second CCN access point.

24. The network device of claim 22, wherein the operations further comprise:
   transmitting a copy of the PIT entries associated with the mobile device to the another network device to be updated at the another network device for forwarding one or more content objects associated with the PIT entries towards the mobile device via the second CCN access point.

25. The network device of claim 22, wherein the updating includes determining the PIT entries associated with the mobile device from a plurality of PIT entries stored in the network device based on an identification associated with the mobile device.

* * * * *